United States Patent
Förster

(10) Patent No.: US 11,828,635 B2
(45) Date of Patent: Nov. 28, 2023

(54) METHOD FOR OPERATING A MAGNETIC-INDUCTIVE FLOWMETER AND CORRESPONDING MAGNETIC-INDUCTIVE FLOWMETER

(71) Applicant: KROHNE Messtechnik GmbH, Duisburg (DE)

(72) Inventor: Jan Förster, Essen (DE)

( * ) Notice: Subject to any disclaimer, the term of this patent is extended or adjusted under 35 U.S.C. 154(b) by 0 days.

(21) Appl. No.: 17/447,733

(22) Filed: Sep. 15, 2021

(65) Prior Publication Data

US 2022/0082417 A1    Mar. 17, 2022

(30) Foreign Application Priority Data

Sep. 15, 2020   (DE) ...................... 10 2020 123 945.9

(51) Int. Cl.
*G01F 1/58*    (2006.01)
*G01F 25/10*    (2022.01)

(52) U.S. Cl.
CPC .............. *G01F 1/584* (2013.01); *G01F 25/10* (2022.01)

(58) Field of Classification Search
CPC ................................ G01F 1/584; G01F 25/10
See application file for complete search history.

(56) References Cited

U.S. PATENT DOCUMENTS

| | | |
|---|---|---|
| 7,788,046 B2 | 8/2010 | Schmalzried et al. |
| 2004/0027132 A1 | 2/2004 | Budmiger |
| 2005/0011278 A1* | 1/2005 | Brown ................. G01N 29/036 73/861.18 |
| 2006/0235634 A1 | 10/2006 | Florin |
| 2008/0250867 A1* | 10/2008 | Schmalzried ............. G01F 1/60 73/861.11 |
| 2012/0004865 A1* | 1/2012 | Porro .................... G01S 7/4916 356/28.5 |

FOREIGN PATENT DOCUMENTS

DE    102007015368 A1    10/2008

* cited by examiner

*Primary Examiner* — Natalie Huls
*Assistant Examiner* — Sharad Timilsina
(74) *Attorney, Agent, or Firm* — Patrick D. Duplessis

(57) ABSTRACT

A method for operating a magnetic-inductive flowmeter includes several steps. In a calibration step, a plurality of noise-removed comparison flow measurement values are determined. A comparison frequency spectrum is determined from at least a part of a plurality of detected, noisy raw measurement signals, on which the calculation of the noise-removed comparison flow measurement values is based. In a measurement operation step, a current noise-removed flow measurement value is calculated from a plurality of detected, noisy raw measurement signals. A current measurement frequency spectrum is determined from at least some of the plurality of detected, noisy raw measurement signals. In a comparison step, the current measurement frequency spectrum is compared with one of the comparison frequency spectra and a deviation value is determined. Depending on the deviation value, the current noise-removed flow measurement value is signaled as unreliable and/or as reliable. A corresponding magnetic-inductive flowmeter is also disclosed.

13 Claims, 5 Drawing Sheets

METHOD FOR OPERATING A MAGNETIC-INDUCTIVE FLOWMETER AND CORRESPONDING MAGNETIC-INDUCTIVE FLOWMETER

TECHNICAL FIELD

The invention relates to a method for operating a magnetic-inductive flowmeter having a measuring tube for guiding a medium, having a magnetic field generator for generating a magnetic field passing through the measuring tube perpendicular to the direction of flow of the medium, having a pair of electrodes for tapping an electrical voltage induced in the medium in the measuring tube as a noisy raw measurement signal, wherein the noisy raw measurement signal is passed on to a signal processing device, and wherein a plurality of detected noisy raw measurement signals are processed by the signal processing device to give at least one noise-removed flow measurement value. Furthermore, the invention also relates to such a magnetic-inductive flowmeter.

BACKGROUND

The flowmeters mentioned above, which are based on the magnetic-inductive measuring principle, have been known for decades. Accordingly, methods for operating such flowmeters as previously described have also been known for a long time. The magnetic-inductive measuring principle is based on the factor of force effect on charge carriers that move perpendicular to a magnetic field or that have a movement component perpendicular to the magnetic field in question. In order to carry out flow measurement based on this principle, the medium carried in the measuring tube must have a certain electrical conductivity. The faster the medium moves through the measuring tube and thus also through the magnetic field generated by the magnetic field generator, the greater the separation of charge carriers in the flowing medium of the corresponding measuring tube section, and the stronger an electric field caused by the charge separation, which is formed between the electrodes of the measuring tube and can be detected as an electric voltage between the electrodes. The measuring voltage between the electrodes develops proportionally to the flow velocity, at least during the period in which the magnetic field is constant and the conductivity of the medium or the charge carrier concentration in the medium is constant.

Even though the basic relationships of the magnetic-inductive measuring principle are perfectly clear, there are still some hurdles to be overcome in measurement practice until a flowmeter is available that reliably provides accurate flow information. One of these hurdles is that the electrical voltage induced in the medium is present as a significantly noisy raw measurement signal at the electrodes of the electrode pair. The signal-to-noise ratio of this noisy raw measurement signal is very unfavorable, so that reliable, stable flow information cannot be obtained directly from the noisy raw measurement data. This noise is mainly due to electrochemical processes at the electrodes.

To reduce the noise caused by electrochemical processes, it is known from the prior art, for example, to constantly change the direction of the magnetic field so that the voltage induced in the medium also changes direction. For this, the direction of the current flowing through the coils in the magnetic field generator is regularly changed. Since the magnetic field direction cannot be changed instantaneously due to the inductances present, but rather there is always a transition range in which the magnetic field is not constant, care must then be taken to ensure that only those raw measurement signals are used to determine the flow rate that have been captured at a constant magnetic field. By switching the magnetic field as described, certain electrochemical effects can be reduced, but the raw measurement signal at the electrodes is still very clearly noisy. In order to develop the noisy raw measurement signal into a suitable noise-removed flow measurement signal, the detected noisy raw measurement signal is noise-removed in a signal processing device, for example by averaging over a plurality of detected, noisy raw measurement signals. This noise-removed flow measurement signal thus obtained is then output via a working signal interface, typically via a 4-20 mA interface (often also with superimposed digital HART protocol).

For the user of a measuring device, it is not only of interest how accurate the measured value delivered by a measuring device is in the error-free case. Depending on the application of the measuring device, it can be of considerable importance to detect the presence of an error in the measuring device, especially such an error that affects the measured value. Such errors are sometimes treacherous, since they do not occur spontaneously and in a clearly recognizable manner, but rather occur as part of a creeping process and are then particularly difficult to detect.

It is therefore the object of the present invention to provide a method of operating a magnetic-inductive flowmeter, and a magnetic-inductive flowmeter operated by such a method, by means of which the accuracy of a determined measured value can be assessed, and which thus enable the user of the flowmeter to be warned of unreliable measured values.

The previously derived and described object is initially and essentially achieved in the method described above for operating a magnetic-inductive flowmeter and in the described magnetic-inductive flowmeter by determining a plurality of noise-removed comparison flow measurement values in a calibration step, and by determining a comparison frequency spectrum for each of the comparison flow measurement values from at least a portion of the plurality of detected noise-removed raw measurement signals on which the calculation of the noise-removed comparison flow measurement values is based. This procedure can be completed at the manufacturer's factory, which has the advantage that volume flow rates can be precisely specified as comparison flow rates. However, the procedure can also be carried out in the process in the installed state. This has the advantage that influences related to the individual installation state are also taken into account. This calibration step does not have to be repeated continuously during normal operation of the magnetic-inductive flowmeter; rather, carrying it out once is also sufficient. It may also be useful to carry out the calibration procedure again, for example, after a revision of the magnetic-inductive flowmeter. In any case, it should be ensured that the step is carried out when the magnetic-inductive flowmeter is in an error-free state.

Furthermore, it is part of the method according to the invention that, in the measurement mode, a current, noise-removed flow measurement value is calculated from a plurality of detected noisy raw measurement signals; this is the quite "normal" determination of a current measurement value. A current measurement frequency spectrum is additionally determined from at least a portion of the multiple detected noisy raw measurement signals on which the calculation of the current noise-removed flow measurement value is based.

Finally, in a comparison step, the current measurement frequency spectrum is compared with one of the comparison frequency spectra and a deviation value is determined. Depending on the deviation value, the current noise-removed flow measurement value is signaled as unreliable and/or as reliable. Thus, it may be that either only unreliable current noise-removed flow measurement values are signaled as unreliable (no signaling upon qualification as "reliable"), or it may be that only reliable current noise-removed flow measurement values are signaled as reliable (no signaling upon qualification as "unreliable"), or it may be that a corresponding qualifying signaling occurs in both cases; of course, a specific, current, noise-removed flow measurement value cannot be signaled as "reliable" and as "unreliable" simultaneously.

In particular, it is provided that when the deviation value deviates from an expected value, the current, noise-removed flow measurement value is signaled as unreliable.

SUMMARY

The present invention is based on the knowledge that the noisy raw measurement signals do not only contain information regarding the induced electrical voltage, i.e., flow information, but rather also information which has not been used at all so far, but which may nevertheless represent a high added value for the user. It has been recognized that the frequency spectrum of the noisy raw measurement signals, which form a noise-removed flow measurement value by means of averaging, changes systematically with the flow. Consequently, the frequency spectrum obtained from noisy raw measurement signals is characteristic for the determined, noise-removed flow measurement value. Thus, if in the error-free state, i.e., in the calibration step mentioned here, the associated comparison frequency spectra are determined for a series of comparison flow measurement values, it is possible to check a current, noise-removed flow measurement value for its accuracy in that the associated, current, measurement frequency spectrum is determined from the noisy raw measurement signals forming the current, noise-removed flow measurement value and compared with a comparison frequency spectrum belonging to a comparison flow measurement value which is as similar as possible to the current, noise-removed measurement flow measurement value.

A further development of the method provides that the amplitude spectrum is used as the frequency spectrum, i.e., the amplitude spectrum of the comparison frequency spectrum and the amplitude spectrum of the current measurement frequency spectrum, wherein, in particular, the frequency spectra are obtained by fast Fourier analysis (FFT) of the detected, noisy raw measurement signals. The detected, noisy raw measurement signals are thus available here in digitized form and in a sampling time raster. The general result of a frequency analysis is usually a complex-valued frequency spectrum, which can be divided according to magnitude and phase into a frequency-dependent amplitude spectrum and a frequency-dependent phase spectrum. It has been found that sufficient comparison results can be achieved when comparing the current measurement frequency spectrum with one of the comparison frequency spectra even if only the corresponding amplitude spectra are used.

According to a preferred design of the method, it is provided that, in the comparison step, the area between the current measurement frequency spectrum and the used comparison frequency spectrum is calculated as the deviation value. Since the most concise changes in the frequency spectra occur at low frequencies, it is particularly provided to calculate the area between the frequency spectra in particular between the amplitude spectra—in a frequency range up to a maximum of 1 kHz, preferably in a frequency range up to a maximum of 500 Hz, very preferably in a frequency range up to a maximum of 300 Hz.

A further development of the method is characterized in that at least one frequency spectrum is smoothed, in particular by applying a moving average, preferably by applying an equally weighted moving average or in particular by applying a smoothing filter according to Savitzky and Golay (Savitzky-Golay filter), in particular with a polynomial order of 2 or 3, and in particular with a range width between 10 and 16, particularly preferably with a range width between 11 and 15. The frequency spectra obtained from the detected, noisy raw measurement signals are also relatively noisy, i.e. provided with relatively large differences between adjacent amplitude values (and possibly phase values, if used for evaluation). In order to facilitate an evaluation of frequency spectra to be compared and also to make them less susceptible to fluctuation, the proposed smoothing of the frequency spectra has proven to be advantageous. In order not to make the calculation of the smoothed frequency spectra too time-consuming, the specified value ranges for the range width and the polynomial order have proven to be advantageous.

The comparison step can be carried out in different ways in the specific implementation. According to a first variation, it is provided that the noise-removed comparison flow measurement values calculated in the calibration step and the associated comparison frequency spectra are at least partially stored. In the comparison step, the measurement frequency spectrum is compared with that comparison frequency spectrum and a corresponding deviation value is determined, said comparison frequency spectrum being the noise-removed comparison flow measurement value that has the smallest difference to the current, noise-removed flow measurement value. In this variation, therefore, a relatively large number of comparison flow measurement values and, above all, associated comparison frequency spectra must be detected and stored in order to ensure discrimination capability for distinguishing between a reliable or accurate and an unreliable or inaccurate current, noise-removed flow measurement value. Since such comparison frequency spectra are always used here, which need to be very similar to the current measurement frequency spectrum in the error-free case, it is provided in particular to define the expected value for the deviation value in a value range around zero.

According to a second variation, it is provided that, in the calibration step, one of the several comparison frequency spectra is selected and stored as reference frequency spectrum—i.e., as reference frequency spectrum for all comparisons. For each of the other comparison frequency spectra, a reference deviation value from the reference frequency spectrum is determined as in the comparison step. These reference deviation values must be stored for later comparison, but the comparison frequency spectra different from the reference frequency spectrum do not have to be stored. In the comparison step, the current measurement frequency spectrum is then compared to the reference frequency spectrum and the deviation value is determined. A suitable reference deviation value or a value derived from the reference deviation values is used as the expected value. In this variation of the method, a series of comparison frequency spectra with associated comparison flow measurement values must also be detected initially, but only for the calibration step.

Furthermore, in the aforementioned variation of the method, it is preferably provided for the comparison step that, from the plurality of reference deviation values, the one whose associated comparison flow measurement value is closest to the current measurement flow measurement value, which is to be checked for its accuracy, is used as a suitable reference deviation value.

With a particularly preferred further development of the method, it is possible to achieve a significantly greater resolution in the comparison step with very little effort, i.e., to produce a more precise dividing line when distinguishing between reliable and unreliable current measured flow measurement values. This is possible by deriving a functional relationship between the deviation value of a comparison frequency spectrum with the reference frequency spectrum and the comparison flow measurement value belonging to the comparison frequency spectrum from the resulting pairs of values. This functional relationship makes it possible to determine an associated reference deviation value—albeit an estimated one—for each current flow measurement value. The comparison is therefore no longer executable only with the number of reference deviation values determined in the calibration step, but practically with any number of—approximated—reference deviation values.

A further development of the aforementioned method is characterized in that the functional relationship is based on an approximation function on the basis of the resulting value pairs from the deviation value of a comparison frequency spectrum with the reference frequency spectrum and the comparison flow measurement value belonging to the comparison frequency spectrum, in particular on an interpolation function or on a compensation function, in particular on a linear or quadratic interpolation function or compensation function.

The method need not be performed entirely on the particular magnetic-inductive flowmeter whose operation is at issue. In particular, the detected, noisy raw measurement signals can be sent to an external computing unit via an interface of the magnetic-inductive flowmeter, where all further calculations can be carried out. In particular, the current, noise-removed flow measurement value and the associated, detected raw measurement signals can also be sent via an interface and the calculation of the current measurement frequency spectrum can be carried out using an external computing unit. Also, all method steps of the calibration step and the comparison step can be carried out externally of the magnetic-inductive flowmeter. It is crucial that, in the end, information about the reliability or unreliability of the current noise-removed flow measurement value is provided.

The derived object is also achieved in the aforementioned magnetic-inductive flowmeter, namely in that at least one comparison frequency spectrum is stored in a storage, which was calculated using several, detected noisy raw measurement signals at a comparison flow measurement value. The calibration process may or may not be carried out entirely by the magnetic-inductive flowmeter. The detection of the noisy raw measurement signals must, of course, take place in the magnetic-inductive flowmeter, but it is not necessary to calculate the comparison frequency spectra there. In the measurement step, a current noise-removed flow measurement value is calculated from a plurality of detected noisy raw measurement signals, and a current measurement frequency spectrum is determined from at least a portion of the plurality of detected noisy raw measurement signals on which the calculation of the current noise-removed flow measurement value is based. In a comparison step, the current measurement frequency spectrum is compared to one of the comparison frequency spectra and a deviation value (D) is determined. If the deviation value deviates from an expected value, the current noise-removed flow measurement value is signaled as unreliable.

Preferably, to signal the unreliability of the current, noise-removed flow measurement value, a corresponding flag is set in the storage, or a corresponding signal is displayed on a display of the magnetic-inductive flowmeter, or a corresponding message is sent via a communication interface of the magnetic-inductive flowmeter, for example, to a process control system or to a connected operating device.

In a preferred design of the magnetic-inductive flowmeter, it is provided that the signal processing device and/or another computing unit is/are designed such that the magnetic-inductive flowmeter carries out the process steps described in detail above during operation.

Each feature described above, which may have been described only in connection with the method for operating a magnetic-inductive flowmeter, can of course equally objectively apply to a magnetic-inductive flowmeter designed to carry out the method described. Conversely, features that may have been described previously only in the context of a magnetic-inductive flowmeter are equally to be understood as features of the method described herein for operating the magnetic-inductive flowmeter, either by themselves or in combination with other features.

BRIEF DESCRIPTION OF THE DRAWINGS

In detail, there are a multitude of possibilities for designing and further developing the method for operating the magnetic-inductive flowmeter according to the invention and the corresponding magnetic-inductive flowmeter according to the invention. For this, reference is made to the following description of embodiments in conjunction with the drawings.

DETAILED DESCRIPTION

Figure 1:
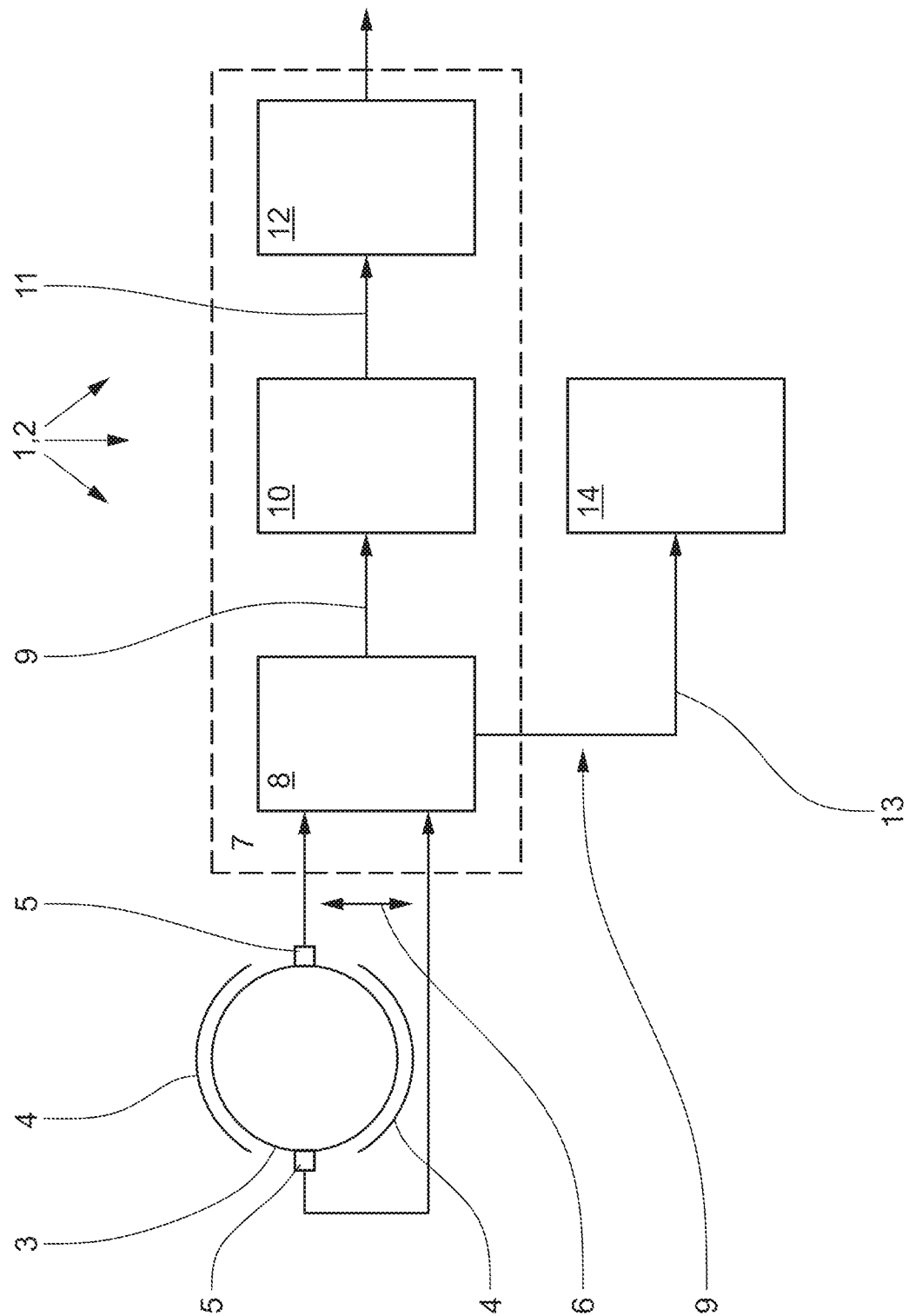
FIG. 1 schematically illustrates a magnetic-inductive flowmeter according to the invention and a corresponding method for operating the magnetic-inductive flowmeter.

FIGS. 1 to 8 each illustrate, with different emphasis, a method 1 for operating a magnetic-inductive flowmeter 2, wherein the magnetic-inductive flowmeter 2 is structurally illustrated in FIG. 1.

The magnetic-inductive flowmeter 2 has a measuring tube 3 for guiding a medium, a magnetic field generator 4 for generating a magnetic field passing through the measuring tube 3 perpendicular to the direction of flow of the medium, and a pair of electrodes 5 for tapping an electric voltage induced in the medium in the measuring tube as a noisy raw measurement signal 6. This arrangement is often referred to as the "sensor" of the magnetic-inductive flowmeter 2.

The noisy raw measurement signal 6 is detected with a signal path 7 (see FIG. 1) by a signal sensor 8 with high impedance by the pair of electrodes 5, and is passed on as a detected, noisy raw measurement signal 9 by the signal sensor 8 to a signal processing device 10. The detected noisy raw measurement signal 9 is processed by the signal processing device 10 at least into a noise-removed flow measurement value 11 and the noise-removed flow measurement value 11 is then output via a working signal interface 12 in the illustrated embodiment. In the illustrated embodiments, the working signal interface 12 is a two-wire current interface with superimposed HART protocol, as is widely used in the process industry. However, the circumstances of the output of the noise-removed flow measurement value 11 are not important in the present case.

The first signal path 7 is surrounded by a dashed box in FIG. 1. These components of the magnetic-inductive flowmeter 2 usually form the so-called transmitter. In order to remove noise from the detected, noisy raw measurement signal 9 in the signal processing device 10, a plurality of individual values are averaged and processed into a usable noise-removed flow measurement value 11.

Figure 2:
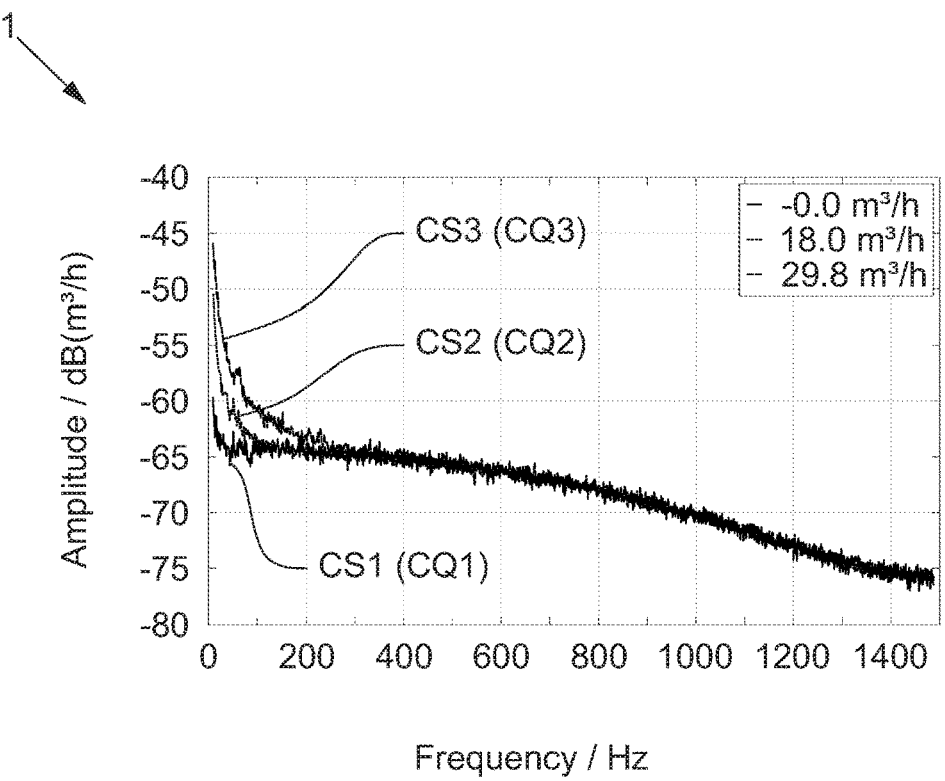
FIG. 2 illustrates a calculated comparison frequency spectra (amplitude spectra) from detected, noisy raw measurement signals.
Figure 3:
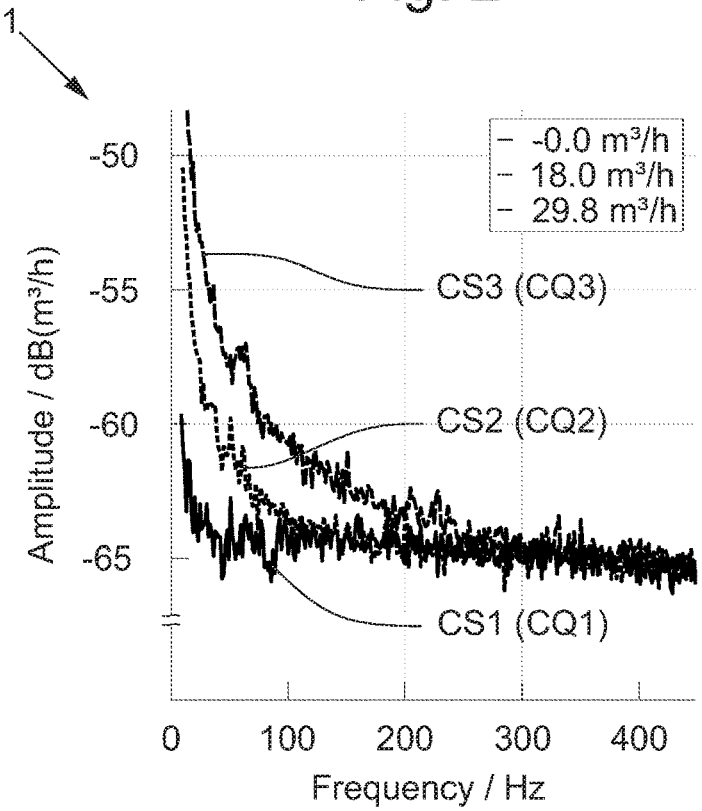
FIG. 3 illustrates a detail from FIG. 2 at low frequencies.

The method 1 illustrated in the figures for operating an magnetic-inductive flowmeter 2, and consequently also the magnetic-inductive flowmeter 2 illustrated in FIG. 1, are characterized in that (shown as a flowchart in FIG. 4) a plurality of noise-removed comparison flow measurement values CQ1, CQ2, CQ3 are determined in a calibration step 15, namely from averaging a plurality of detected, noisy raw measurement signals 9. From at least a portion of the plurality of detected noisy raw measurement signals 9 on which the calculation of the noise-removed comparison flow measurement values CQ1, CQ2, CQ3 is based, a comparison frequency spectrum CS1, CS2, CS3 is determined for each of the noise-removed comparison flow measurement values CQ1, CQ2, CQ3. FIGS. 2 and 3 show the comparison frequency spectra CS1, CS2, CS3 determined for the comparison flow measurement values CQ1, CQ2, CQ3. To make it clear that the comparison frequency spectra CS1, CS2, CS3 have been calculated using the detected, noisy raw measurement data 9 which also formed the basis for the determination of the corresponding comparison flow measurement values CQ1, CQ2, CQ3, the symbolic notation CS1(CQ1), CS2(CQ2), CS3(CQ3) has been used for the comparison frequency spectra CS1, CS2, CS3.

Figure 4:
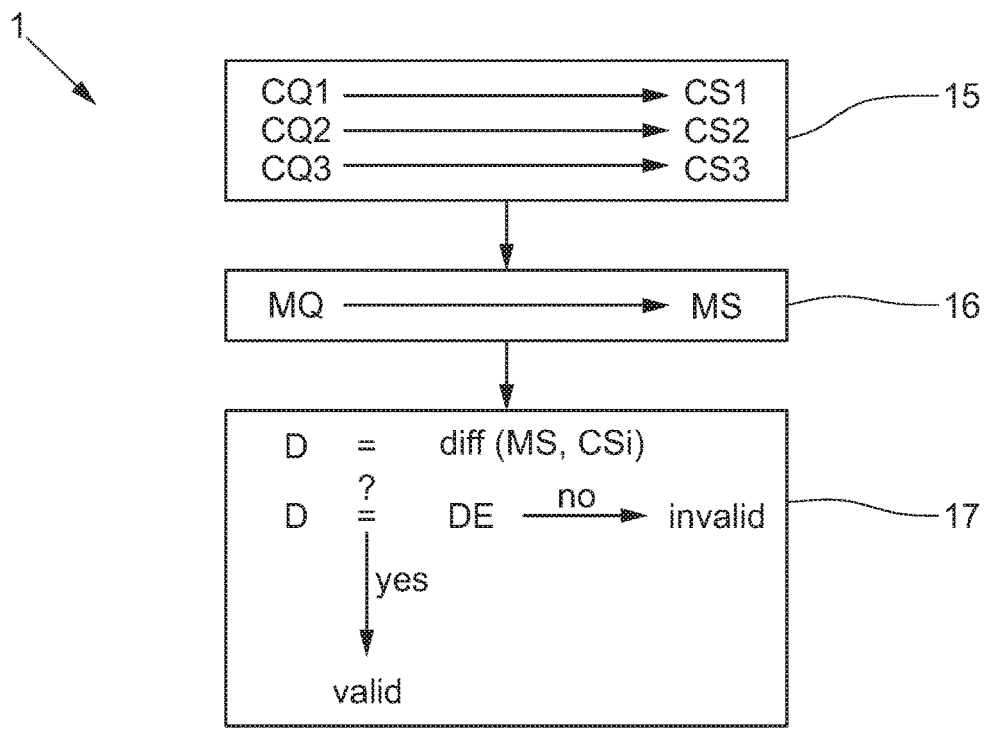
FIG. 4 illustrates a schematic of the described method for operating a magnetic-inductive flowmeter as a flowchart.

The letter designators used here for various process objects serve to improve the identifiability of the represented object variables of the method; in the strict sense, they are not formula symbols, but rather "descriptive" reference symbols. In FIG. 4, the relationship between comparison flow measurement values CQi and corresponding comparison frequency spectra CSi is illustrated by correlation arrows in the calibration step 15. It is important to note that the comparison frequency spectra CS1, CS2, CS3 calculated for the noise-removed comparison flow measurement values CQ1, CQ2, CQ3, respectively, are characteristic of the comparison flow measurement values CQ1, CQ2, CQ3; the method for determining the reliability or plausibility and accuracy of a current flow measurement value is based on this finding.

In FIGS. 2 and 3 it can be seen that the amplitudes of the comparison frequency spectra CSi change systematically with changing flow measurement values CQi, especially at low frequencies. This relationship is used in the method 1 according to the invention. The comparison flow measurement values CQi have been chosen here to cover the entire used measurement range as far as possible.

The calibration step 15 is usually carried out once in the error-free state of the magnetic-inductive flowmeter 2, for example as a factory calibration or immediately after installation of the magnetic-inductive flowmeter 2 in the user's process.

In the subsequent measurement operation 16, a current noise-removed flow measurement value MQ is calculated from a plurality of detected, noisy raw measurement signals 9. A current measurement frequency spectrum MS is determined from at least a portion of the plurality of detected, noisy raw measurement signals 9 on which the calculation of the current noise-removed flow measurement value MQ is based. This measurement frequency spectrum MS is not shown in the figures for reasons of clarity; it would be located in the range of the comparison frequency spectra CSi as a further frequency spectrum.

Finally, in a comparison step 17, the current measurement frequency spectrum MS is compared with one of the comparison frequency spectra CSi and a deviation value D is determined. In FIG. 4, the determination of the deviation value D is symbolically described by a functionality diff (MS, CSi). Depending on the deviation value D, the current noise-removed flow measurement value MQ is signaled as unreliable. In the embodiments, it is provided that a deviation of the deviation value D from an expected value DE is signaled, that the current noise-removed flow measurement value MQ has been classified as unreliable (invalid), otherwise the flow measurement value MQ is reliable (valid).

In the embodiments shown, the method 1 is implemented such that the amplitude spectra are used as the frequency spectra CS, MS respectively, i.e., the amplitude spectrum of the comparison frequency spectrum CS and the amplitude spectrum of the current measurement frequency spectrum MS. Since the detected, noisy raw measurement signals 9 already represent digitized values in a time sampling system (A/D conversion), the frequency spectra are all obtained here by fast Fourier analysis of the detected, noisy raw measurement signals 9. FIG. 1 shows that the detected, noisy raw measurement signals 9 are fed via a further signal path 13 to a second signal processing device 14, where frequency analysis is implemented. The calculation could also have taken place in the signal processing device 10. Here, the depicted path of a separate, further signal path 13 has been followed in order not to jeopardize an existing certification of the first signal path 7 (in this case with respect to the safety integrity level, SIL).

In all embodiments of the method 1, the present procedure is such that, in the comparison step 17, the area between the current measurement frequency spectrum MS and the used comparison frequency spectrum CS is calculated as the deviation value D. The deviation value D is the area between the current measurement frequency spectrum MS and the used comparison frequency spectrum CS. In particular, the area calculation not shown in detail is carried out in a frequency range up to 500 Hz. In particular, it can be seen in FIG. 3 that, in this range, there is a particularly large variance of the frequency spectra at different flow rates, so that differences between the frequency spectra to be compared are particularly easy to recognize.

On the basis of FIGS. 3 and 5, it is particularly easy to see that the frequency spectra CS obtained from the noisy raw measurement signals 9 are also very noisy, i.e., have large amplitude differences at amplitudes adjacent in frequency. As a result, the area calculation between two frequency spectra described above is also very turbulent, even for frequency spectra that have been determined for closely spaced flows. In order to achieve a less fluctuating behavior, the frequency spectra CS, MS are smoothed, in the present case—although not explicitly shown—by applying an equally weighted moving average using 20 adjacent values of the frequency spectrum.

In the embodiments shown, the permissible deviation of the deviation value D from the expected value DE is described by a tolerance band 18 around the expected values DE or a course of the expected values DE. If the deviation value D is within the tolerance band 18, then D=DE is considered to be fulfilled and an accurate measured value is present (see FIGS. 7 and 8).

There are different possibilities for implementing the comparison step 17. Two variations are described below.

A first variation of the method 1 provides that the noise-removed comparison flow measurement values CQi calculated in calibration step 15 and the associated comparison frequency spectra CSi, i.e., for example as shown in FIGS. 2 and 3, are at least partially stored and, in the comparison step 17, the measurement frequency spectrum MS is compared with that comparison frequency spectrum CSi and a deviation value D is determined, said comparison frequency spectrum CSi belonging to the noise-removed comparison flow measurement value CQi which has the smallest difference from the current noise-removed flow measurement value MQ. FIG. 3 shows different comparison frequency spectra CSi, namely the comparison frequency spectra CS1, CS2, CS3, to which the comparison flow measurement values CQi, i.e., CQ1, CQ2 and CQ3 belong. The specific flow values for this purpose are 0 m^3/h, 18 m^3/h and 29.8 m^3/h. A measurement frequency spectrum MS is not shown, nevertheless the aforementioned variation can be explained with reference to FIG. 3.

If it is assumed that a current noise-removed flow measurement value MQ with MQ=17 m^3/h is determined and the measurement is error-free, then the associated measurement frequency spectrum MS must be compared with the comparison frequency spectrum CS2, because the comparison flow measurement value CQ2 belonging to the comparison frequency spectrum CS2 is closest to the current noise-removed flow measurement value MQ. Since freedom from error is assumed, the measurement frequency spectrum MS will be practically congruent with the comparison frequency spectrum CS2. If the difference area of the two frequency spectra MS and CS2 is calculated as the deviation value D, it will have a value close to zero. This is always true in the error-free case, which is why the expected value E defines a range of values around zero. In the case of error, the frequency spectra are further apart with a difference area more or less clearly different from zero, which is why the current noise-removed flow measurement value to be tested is recognized as unreliable and signaled as unreliable accordingly.

In contrast, a second variation of the method 1 is characterized in that, in the calibration step 15, one of the plurality of comparison frequency spectra CSi is selected and stored as reference frequency spectrum CSref. For each of the other comparison frequency spectra CSi, a reference deviation value Di,ref is determined with respect to the reference frequency spectrum CSref, thus in principle as in the comparison step 17. In the comparison step 17, the current measurement frequency spectrum MS is compared with the reference frequency spectrum CSref and the deviation value D is determined. A suitable reference deviation value Di,ref or a value Dref derived from the reference deviation values Di,ref is used as the expected value DE.

The method 1 can be explained with reference to FIGS. 5 to 7, even though, again, no current measurement frequency spectrum MS is shown here. The frequency spectra in FIGS. 5a and 5b correspond to the frequency spectra in FIGS. 2 and 3. The comparison frequency spectrum CS1 is selected and stored at the reference frequency spectrum CSref. The reference deviation values D2,ref and D3,ref are determined for each other comparison frequency spectrum, i.e. for the comparison frequency spectra CS2 and CS3 (dashed difference areas in FIGS. 5a and 5b). In the notation of FIG. 4, with respect to the comparison step 17, it should therefore read: D2,ref=diff(CS2, CSref) and D3,ref=diff(CS3, CSref). Only these values have to be stored, the comparison frequency spectra CS2 and CS3 does not. Now, if a current, noise-removed flow measurement value MQ with its current measurement frequency spectrum MS is available, the measurement frequency spectrum MS is compared with the reference frequency spectrum CSref and a corresponding deviation value D is obtained, i.e.: D=diff(MS,CSref).

If it is again assumed that the current, noise-removed flow measurement value MQ has been determined to be MQ=17 m^3/h and the measurement is error free, then the appropriate reference deviation value Di,ref as the expected value DE is the reference deviation value D2,ref because it is the reference deviation value out of the plurality of reference deviation values Di,ref whose associated comparison flow measurement value CQ2 is closest to the current measurement flow measurement value MQ. Assuming no error in determining the current, noise-removed flow measurement value MQ, D=D2,ref then practically holds true, D is thus close to D2,ref, in particular within a tolerance range 18 around D2,ref.

Figure 6:
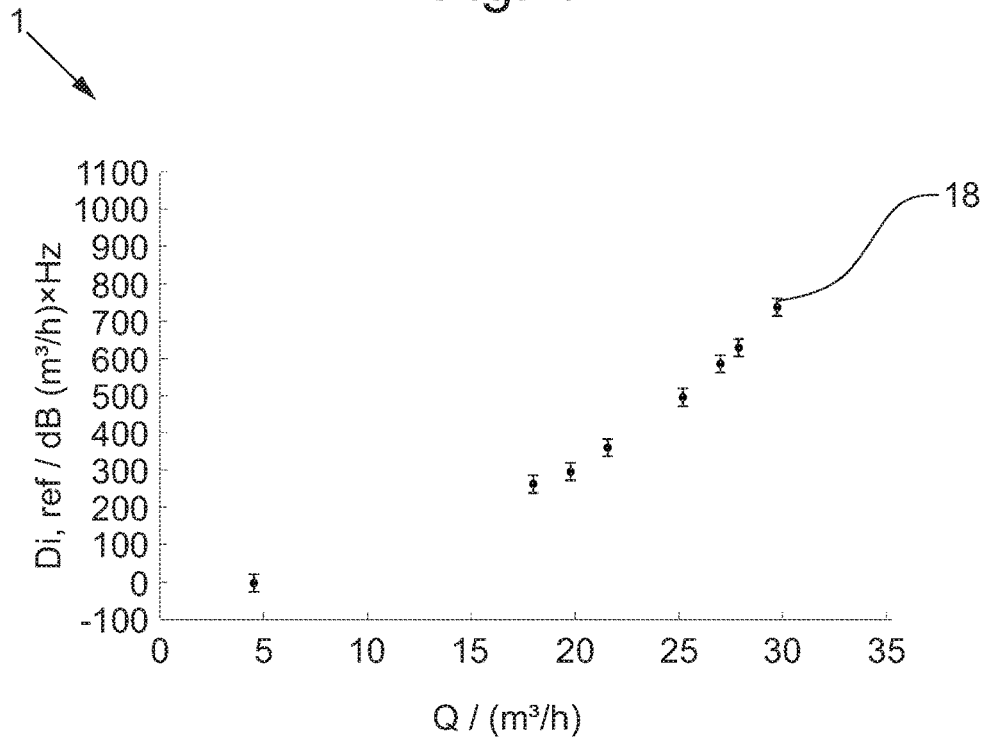
FIG. 6 illustrates a reference deviation values in dependence on flow rate.
Figure 5A:
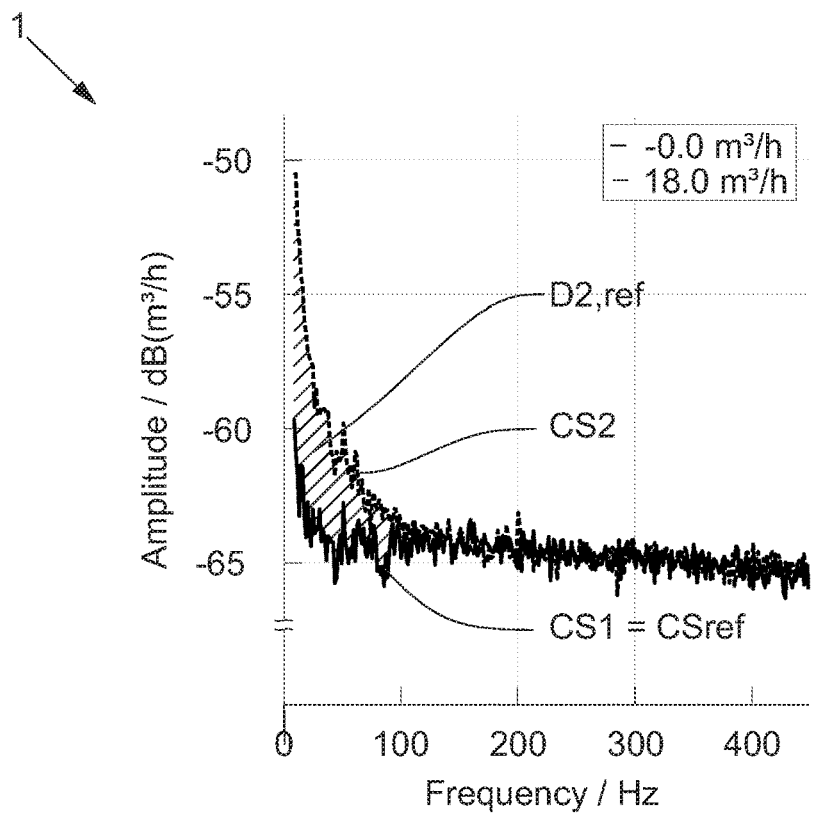
FIGS. 5a and 5b each illustrate a reference frequency spectrum with a comparison frequency spectrum.
Figure 5B:
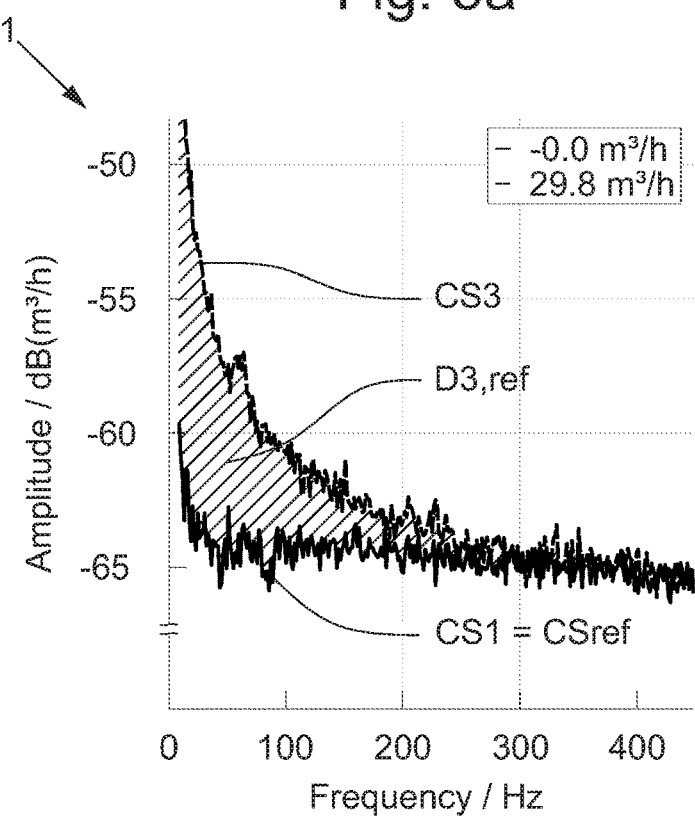
Figure 7:
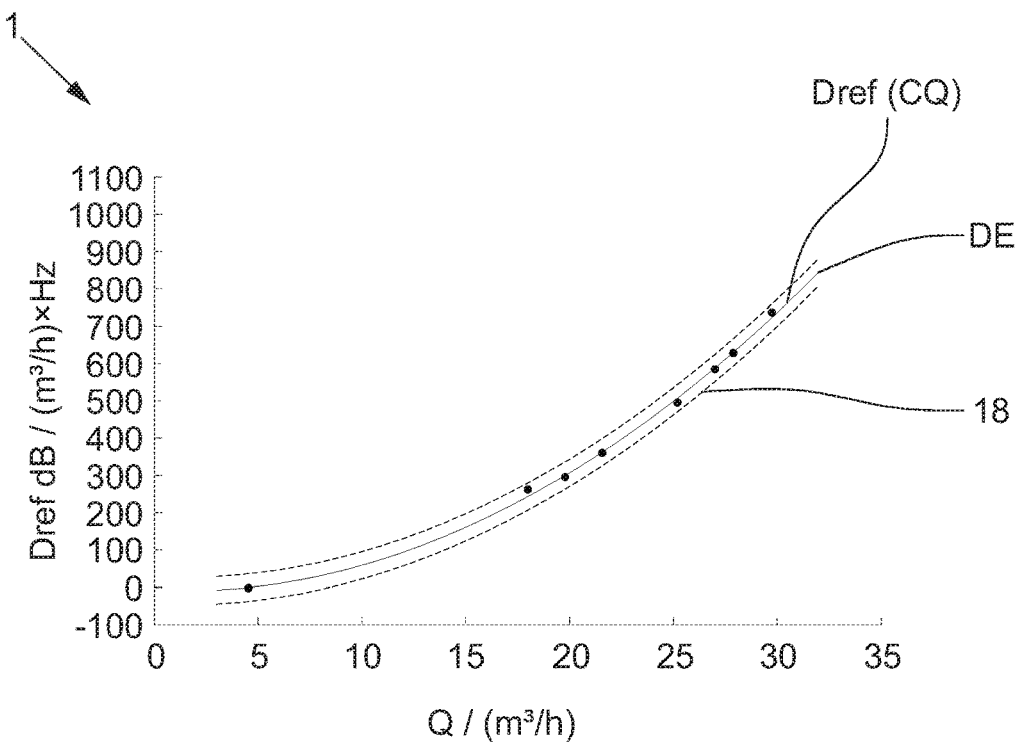
FIG. 7 illustrates a functional relationship between the reference deviation value and the comparison flow measurement value with tolerance band for the expected value for a measuring tube with round diameter reduction.
Figure 8:
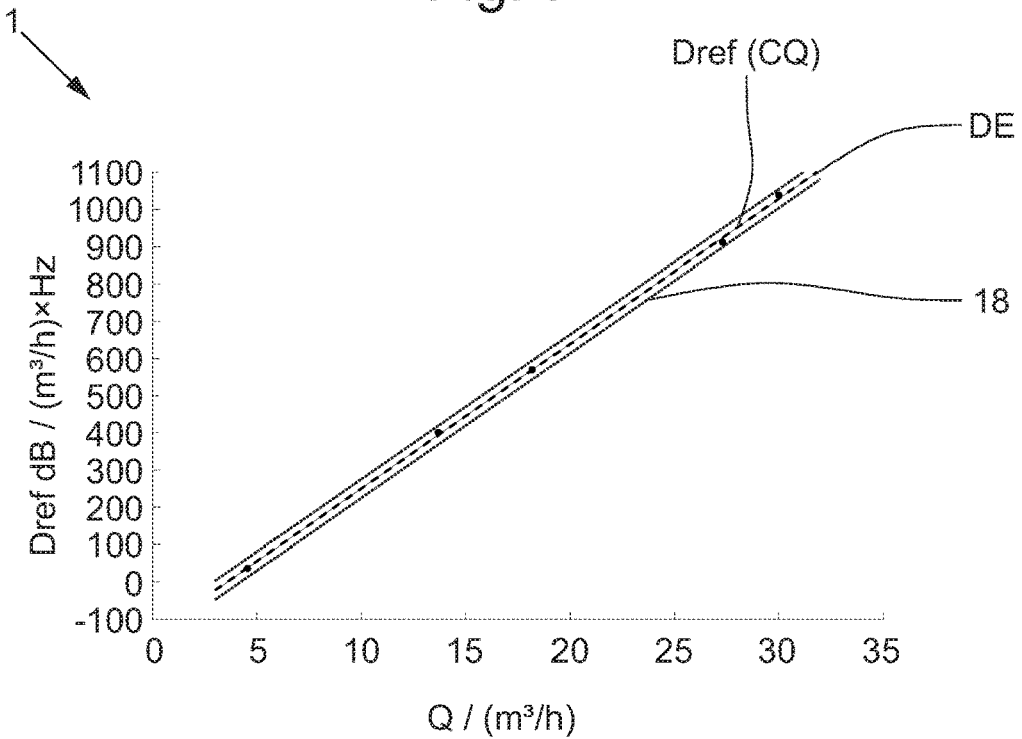
FIG. 8 illustrates a functional relationship between the reference deviation value and the comparison flow measurement value with tolerance band for the expected value for a measuring tube with square diameter reduction.

The example given works well because a current, noise-removed flow measurement value MQ has been intentionally assumed to be very close to an available comparison flow measurement value, namely CQ2. In order to achieve good coverage over the measurement range of the magnetic-inductive flowmeter 2 using the method 1, it is necessary to work with a larger number of comparison flow measurement values CQ, which is indicated in FIG. 6. Here, eight reference deviation values Di,ref have been determined for eight comparison flow measurement values CQ or for their associated comparison frequency spectra. Tolerance ranges 18 are also indicated.

As can be seen from FIG. 6, the reference deviation values Di,ref are ordered in such a way that it is convenient to derive a functional relationship Dref(CQ) between the reference deviation value Dref and the comparison flow measurement value CQ from the resulting pairs of values (Di,ref, CQi) from the deviation value Di,ref of a comparison frequency spectrum CSi with the reference frequency spectrum CSref and the comparison flow measurement value CQi belonging to the comparison frequency spectrum CSi. In particular, the functional relationship is based on an approximation function based on the resulting pairs of values (Di,ref, CQi) from the deviation value Di,ref of a comparison frequency spectrum CSi with the reference frequency spectrum CSref and the comparison flow measurement value CQi associated with the comparison frequency spectrum CSi, where a quadratic compensation function has been calculated in FIG. 7.

Interestingly, the relationship Dref(CQ) is clearly dependent on the geometry of the measuring tube 3. While the measuring tube 3 in FIG. 7 has a round diameter reduction (to increase the flow velocity in the measuring cross section), the measuring tube 3 in FIG. 8 has a rectangular diameter reduction. In the first case, the relationship Dref (CQ) can be reproduced very well by means of a quadratic compensation function, in the second case even a linear compensation function is sufficient.

The invention claimed is:

1. A method for operating a magnetic-inductive flowmeter with a measuring tube for guiding a medium, with a magnetic field generator for generating a magnetic field passing through the measuring tube perpendicular to the direction of flow of the medium, with a pair of electrodes for tapping an electrical voltage induced in the medium in the measuring tube as a noisy raw measurement signal, wherein the noisy raw measurement signal is passed on to a signal processing device as a detected, noisy raw measurement signal and a plurality of detected, noisy raw measurement signals are processed at least into a noise-removed flow measurement value by the signal processing device, the method comprising:
   a calibration step, in which a plurality of noise-removed comparison flow measurement values are determined, wherein from at least a part of the plurality of detected, noisy raw measurement signals, on which the calculation of the noise-removed comparison flow measurement values is based, a comparison frequency spectrum is determined in each case for the noise-removed comparison flow measurement values;
   a measurement operation step, in which a current noise-removed flow measurement value is calculated from a plurality of detected, noisy raw measurement signals, wherein a current measurement frequency spectrum is determined from at least some of the plurality of detected, noisy raw measurement signals on which the calculation of the current noise-removed flow measurement value is based; and
   a comparison step, in which the current measurement frequency spectrum is compared with one of the comparison frequency spectra and a deviation value is determined, wherein an area between the current measurement frequency spectrum and the used comparison frequency spectrum is calculated as the deviation value and, depending on the deviation value, the current noise-removed flow measurement value is signaled as unreliable and/or as reliable.

2. The method according to claim 1, wherein if the deviation value deviates from an expected value, the current noise-removed flow measurement value is signaled as unreliable.

3. The method according to claim 1, wherein the amplitude spectrum of the comparison frequency spectrum and the amplitude spectrum of the current measurement frequency spectrum are obtained by fast Fourier analysis of the detected, noisy raw measurement signals.

4. The method according to claim 1, wherein at least one frequency spectrum is smoothed by at least one of: applying a moving average;
   applying an equally weighted moving average; applying a smoothing filter according to Savitzky and Golay; applying a Savitzky-Golay filter with a polynomial order of 2 or 3;
   applying a Savitzky-Golay filter with a range width between 10 and 16; and applying a Savitzky-Golay filter with a range width between 11 and 15.

5. The method according to claim 2, wherein the permissible deviation of the deviation value from the expected value is described by a tolerance band around the expected values or a course of the expected values.

6. The method according to claim 1, wherein the noise-removed comparison flow measurement values calculated in the calibration step and the associated comparison frequency spectra are at least partially stored and, in the comparison step, the measurement frequency spectrum is compared with that comparison frequency spectrum and a deviation value is determined, which belongs to the noise-removed comparison flow measurement value having the smallest difference from the current noise-removed flow measurement value.

7. The method according to claim 1, wherein, in the calibration step, one of the plurality of comparison frequency spectra is selected and stored as reference frequency spectrum;
   wherein for the other comparison frequency spectra a reference deviation value to the reference frequency spectrum is determined as in the comparison step; and
   wherein, in the comparison step, the current measurement frequency spectrum is compared with the reference frequency spectrum and the deviation value is determined, wherein a suitable reference deviation value or a value derived from the reference deviation values is used as the expected value.

8. The method according to claim 7, wherein from the plurality of reference deviation values, the one whose associated comparison flow measurement value is closest to the current measurement flow measurement value is used as a suitable reference deviation value.

9. The method according to claim 7, wherein a functional relationship between the reference deviation value and the comparison flow measurement value belonging to the comparison frequency spectrum and the comparison flow measurement value is derived from the resulting pairs of values from the deviation value of a comparison frequency spectrum with the reference frequency spectrum.

10. The method according to claim 9, wherein the functional relationship is derived based on an approximation function based on the resulting pairs of values from the deviation value of a comparison frequency spectrum with the reference frequency spectrum and the comparison flow measurement value belonging to the comparison frequency spectrum.

11. A magnetic-inductive flowmeter, comprising:
    a measuring tube for guiding a medium;
    a magnetic field generator for generating a magnetic field passing through the measuring tube perpendicular to the direction of flow of the medium,
    a pair of electrodes for tapping an electrical voltage induced in the medium in the measuring tube as a noisy raw measurement signal, wherein the noisy raw measurement signal is passed on to a signal processing device as a detected, noisy raw measurement signal and a plurality of detected, noisy raw measurement signals are processed by the signal processing device at least into a noise-removed flow measurement value;
    wherein at least one comparison frequency spectrum which has been calculated from a plurality of detected, noisy raw measurement signals at a comparison flow measurement value is stored in a memory;
    wherein, in the measurement mode, a current noise-removed flow measurement value is calculated from a plurality of detected, noisy raw measurement signals, wherein a current measurement frequency spectrum is determined from at least some of the plurality of detected, noisy raw measurement signals on which the calculation of the current noise-removed flow measurement value is based; and wherein, in a comparison step, the current measurement frequency spectrum is compared with one of the comparison frequency spectra and a deviation value is determined, wherein an area between the current measurement frequency spectrum and the used comparison frequency spectrum is calculated as the deviation value and, depending on the deviation value, the current noise-removed flow measurement value is signaled as unreliable and/or as reliable.

12. The magnetic-inductive flowmeter according to claim 11, wherein, for signaling the unreliability of the current noise-removed flow measurement value, a corresponding flag is set in the storage, or a corresponding signal is displayed on a display of the magnetic-inductive flowmeter, or a corresponding message is sent via a communication interface.

13. The magnetic-inductive flowmeter according to claim 11, wherein the signal processing device and/or another computing unit signal the current noise-removed flow measurement value as unreliable if the deviation value deviates from an expected value.

* * * * *